(12) United States Patent
Snyder (10) Patent No.: US 10,502,131 B2
(45) Date of Patent: Dec. 10, 2019

(54) WAVE ROTOR WITH PISTON ASSEMBLY

(71) Applicant: Rolls-Royce North American Technologies, Inc., Indianapolis, IN (US)

(72) Inventor: Philip H. Snyder, Avon, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 1221 days.

(21) Appl. No.: 15/044,674

(22) Filed: Feb. 16, 2016

(65) Prior Publication Data

US 2016/0245111 A1     Aug. 25, 2016

Related U.S. Application Data

(60) Provisional application No. 62/118,791, filed on Feb. 20, 2015.

(51) Int. Cl.
  *F02C 5/02*    (2006.01)
  *F23R 3/56*    (2006.01)
  *F23R 7/00*    (2006.01)

(52) U.S. Cl.
  CPC ............. *F02C 5/02* (2013.01); *F23R 3/56* (2013.01); *F23R 7/00* (2013.01)

(58) Field of Classification Search
  CPC ............... F02C 5/02; F23R 3/56; F23R 7/00
  See application file for complete search history.

(56) References Cited

U.S. PATENT DOCUMENTS

| 1,620,565 | A | 3/1927 | McKeown |
| 2,930,196 | A | 3/1960 | Hertzberg et al. |
| 2,942,412 | A * | 6/1960 | Bollay ............... F02K 7/06 60/247 |
| 3,164,318 | A | 1/1965 | Barnes et al. |
| 3,417,564 | A * | 12/1968 | Call ................. F02C 5/12 60/248 |
| 3,811,796 | A | 5/1974 | Coleman et al. |
| 3,879,937 | A | 4/1975 | Jenny |
| 4,398,868 | A | 8/1983 | Komauer et al. |
| 5,069,600 | A | 12/1991 | Althaus et al. |
| 5,267,432 | A | 12/1993 | Paxson |
| 5,916,125 | A | 6/1999 | Snyder |
| 6,351,934 | B2 | 3/2002 | Snyder |
| 6,439,209 | B1 | 8/2002 | Wenger et al. |

(Continued)

FOREIGN PATENT DOCUMENTS

WO     2014018416 A1     1/2014

OTHER PUBLICATIONS

European Official Action dated Nov. 8, 2018 in connection with EP Appln. No. 16155744.2, 7 pages.

(Continued)

*Primary Examiner* — Lorne E Meade (74) *Attorney, Agent, or Firm* — Barnes & Thornburg LLP (57) ABSTRACT

A wave rotor includes an inlet plate, an outlet plate, and a rotor drum positioned therebetween. The inlet plate is formed to include an inlet port arranged to receive gasses. The outlet plate is formed to include an outlet port arranged to receive the gasses flowing out of the wave rotor. The rotor drum is arranged to rotate relative to the inlet and outlet plates. A piston assembly is used to counteract forces from pressure built up in the rotor drum.

13 Claims, 8 Drawing Sheets

(56) References Cited

U.S. PATENT DOCUMENTS

| | | | |
|---|---|---|---|
| 6,449,939 B1 | 9/2002 | Snyder | |
| 6,460,342 B1* | 10/2002 | Nalim | F02C 3/02 60/39.45 |
| 6,845,620 B2 | 1/2005 | Nalim | |
| 6,988,493 B2 | 1/2006 | Wenger et al. | |
| 7,137,243 B2 | 11/2006 | Snyder et al. | |
| 7,520,123 B2 | 4/2009 | Saddoughi et al. | |
| 7,621,118 B2 | 11/2009 | Snyder et al. | |
| 7,891,164 B2 | 2/2011 | Janssen et al. | |
| 8,117,828 B2 | 2/2012 | Snyder et al. | |
| 8,443,583 B2* | 5/2013 | Nalim | F02C 5/04 60/247 |
| 2007/0157625 A1 | 7/2007 | Snyder et al. | |
| 2012/0204534 A1* | 8/2012 | Kenyon | F02C 5/12 60/204 |
| 2012/0216503 A1 | 8/2012 | Snyder | |
| 2012/0216504 A1 | 8/2012 | Snyder | |

OTHER PUBLICATIONS

Extended European Search Report, European Application No. 16155744. 2-1605, dated Aug. 1, 2016, 9 pages.
Comparison Between Simulated and Experimentally Measured Performance of a Four Port Wave Rotor, Daniel E. Paxson, Jack Wilson, Gerard E. Welch, AIAA2007-5049.
Experimental Results of Performance Tests on a Four-Port Wave Rotor, Jack Wilson, Gerard E. Welch, Daniel E. Paxson, AIAA 2007-1250.
Snyder, Philip H. and Nalim, M. Razi, Pressure Gain Combustion Application to Marine and Industrial Gas Turbines, ASME GT2012-69886, Proceedings of the ASME Turbo Expo Jun. 11-15, 2012.
Snyder, P.H., Elharis, T.M., Wijeyakulasuriya, S.D., M. Razi Nalim, Matsutomi, Y., and Meyer S.E., Pressure Gain Combustor Component Viability Assessment Based on Initial Testing, AIAA paper 2011-5749, 47th AIAA/ASME/SAE/ASEE Joint Propulsion Conference, San Diego CA, 2011.
Matsutomi, Y., Meyer S.E., Wijeyakulasuriya, S.D., Izzy, Z., Nalim, M.R., Shimo, M., Kowalkowski, M., and Snyder, P.H., Experiemental Investigation on the Wave Rotor Combustor, AIAA paper 2010-7043, Joint Propulsion Conference Jul. 2010.
Snyder, P.H., Seal Technology Development for Advanced Component for Airbreathing Engines, Rolls-Royce North American Technologies, Inc., Indianapolis, IN, NASA/CR-2008-215479, Dec. 2008.
Akbari, P., Nalim M.R., Donovan, E.S. and Snyder, P.H., Leakage Assessment of Pressure-Exchange Wave Rotors, AIAA Journal of Propulsion & Power, vol. 2, No. 4, Jul.-Aug. 2008.
Alkbari, P., M.R. Nalim, and P.H. Snyder, Numerical Simulation and Deflagrative and Detonative Combustion Wave Rotors, AIAA paper 2006-5134.
B. Alparslan, M.R. Nalim, and P.H. Snyder, Wave Rotor Combustor Test Rig Preliminary Design, 2004 International Mechanical Engineering Congress, ASME Paper IMECE2004-61795, Nov. 2004.
Snyder, P.H., Alparslan, B., and Nalim, M.R., Gas Dynamic Analysis of the CVC, A Novel Detonation Cycle, AIAA paper 2002-4069, Joint Propulsion Conference 2002, Indianapolis, IN.
Smith, C.F., Snyder, P.H., Emmerson, C.W., Impact of the Constant Volume Combustor on a Supersonic Turbofan Engine, AIAA paper 2002-3916, Joint Propulsion Conference 2002, Indianapolis, IN.
Welch, G.E., Paxon, D.E., Wilson, J. and Snyder, P.H., Wave-Rotor-Enhanced Gas Turbine Engine Demonstrator, NASA/TM-1999-209459.
Weber, K.F., and Snyder, P.H., Wave Rotor to High Pressure Turbine Transition Duct Flow Analysis, AIAA Paper-98-3250.
Gegg, S.G., and Snyder, P.H., Aerodynamic Design of a Wave Rotor to High Pressure Turbine Transition Duct, AIAA-98/3249, Jul. 1998.
Snyder, P.H., Wave Rotor Demonstrator Engine Assessment, NASA CR-198496, Jun. 1996.
Snyder, P.H., and Fish, R.E., Assessment of a Wave Rotor Topped Demonstrator Gas Turbine Engine Concept, ASME-96-GT-41, Jun. 1996.

* cited by examiner

WAVE ROTOR WITH PISTON ASSEMBLY

CROSS REFERENCE TO RELATED APPLICATIONS

This application claims priority to and the benefit of U.S. Provisional Patent Application No. 62/118,791, filed 20 Feb. 2015, the disclosure of which is now expressly incorporated herein by reference.

FIELD OF THE DISCLOSURE

The present disclosure relates generally to wave rotors and more specifically to wave rotors with piston assemblies.

BACKGROUND

Gas turbine engines are used to power aircraft, watercraft, power generators, and the like. Gas turbine engines typically include a compressor, a combustor, and a turbine. The compressor compresses air drawn into the engine and delivers high-pressure air to the combustor. In the combustor, a mixture including fuel and the high-pressure air is ignited. Products of the combustion reaction in the combustor are directed into the turbine where work is extracted to drive the compressor and, sometimes, an output shaft. Leftover combustion products are exhausted out of the turbine and may provide thrust in some applications.

In some engines, the combustor includes a wave rotor assembly that burns fuel and high-pressure air and discharges combustion products to the turbine to drive rotation of the turbine. Wave rotor assemblies may include a wave rotor combustor. Wave rotor assemblies may also be used as pressure exchangers, flow dividers, flow combiners, etc. Typical wave rotor combustors include an inlet plate, an outlet plate spaced apart from the inlet plate along a central axis of the wave rotor combustor, and a rotor drum positioned between the plates. The inlet plate provides an inlet port through which a flow of air and fuel pass into rotor passages formed in the rotor drum. The rotor drum receives and combusts the fuel-air mixture to produce hot high-pressure products as the rotor drum rotates about the central axis. The outlet plate provides an outlet port for the hot high-pressure products to exit the wave rotor combustor.

SUMMARY

The present disclosure may comprise one or more of the following features and combinations thereof.

According to an aspect of the present disclosure, a wave rotor assembly may include a rotor drum, an outlet plate, and a piston assembly. The rotor drum may have a forward end and an aft end. The rotor drum may be mounted for rotation about a central axis and include a plurality of rotor passages spaced apart from the central axis that extend along the central axis. The outlet plate may be offset from the aft end of the rotor drum by a clearance gap arranged to interact with gasses exiting the rotor passages at the aft end of the rotor drum. The outlet plate may be mounted for translation along the central axis relative to the rotor drum. The piston assembly may include a housing and a piston movable relative to the housing into engagement with the outlet plate to counteract pressure forces applied onto the outlet plate by gasses within the rotor passages at the aft end of the rotor drum to control translation of the outlet plate along the central axis.

In some embodiments, the outlet plate may be formed to include an outlet port spaced circumferentially apart from the piston assembly and a pressurizing passage aligned circumferentially with the piston assembly to allow gasses in the rotor passages at the aft end of the rotor drum to communicate with the piston assembly. In some embodiments, the piston may be formed to include a piston passage aligned with the pressurizing passage formed in the outlet plate.

In some embodiments, the piston may include a front face that faces the outlet plate and a back face spaced apart from and opposite the front face. The piston passage may extend through the piston between the front face and the back face.

In some embodiments, the outlet port may extend circumferentially around a portion of the outlet plate to conduct gasses exiting out of the rotor passages at the aft end of the rotor drum. In some embodiments, the pressure forces of the gasses within the rotor passages may be applied onto the outlet plate in a predetermined region. The piston may be aligned with the predetermined region.

In some embodiments, the piston may be mounted in the housing for movement along a piston axis that is spaced apart from and parallel to the central axis.

In some embodiments, the wave rotor assembly may further include an inlet plate arranged adjacent to the forward end of the rotor drum. The inlet plate may be formed to include an inlet port aligned with at least some of the rotor passages at the forward end of the rotor drum.

In some embodiments, the rotor drum may be mounted for rotation about the central axis relative to the inlet plate. In some embodiments, the rotor drum may include an inner tube, an outer tube, and a plurality of webs extending radially between the inner tube and the outer tube to define the rotor passages.

According to another aspect of the present disclosure, a wave rotor assembly may include a rotor drum, an inlet plate, and a piston assembly. The rotor drum may have a forward end and an aft end. The rotor drum may be mounted for rotation about a central axis and include a plurality of rotor passages spaced apart from the central axis that extend along the central axis. The inlet plate may be arranged to block gasses from exiting the rotor passages at the forward end of the rotor drum. The piston assembly may be arranged to engage with the inlet plate to counteract pressure forces applied onto the inlet plate by gasses within the rotor passages at the forward end of the rotor drum.

In some embodiments, the inlet plate may be formed to include a pressurizing passage. The pressurizing passage may be aligned circumferentially with the piston assembly to allow gasses in the rotor passages to communicate with the piston assembly.

In some embodiments, the piston assembly may include a housing and a piston. The housing may be formed to include a piston passage aligned with the pressurizing passage formed in the inlet plate. In some embodiments, the piston may be coupled to a fixed portion of the wave rotor assembly.

In some embodiments, the piston assembly may include a piston and a housing engaged with the inlet plate. The pressure forces of the gasses within the rotor passages may be applied onto the inlet plate in a predetermined region. The housing may be aligned with the predetermined region.

In some embodiments, the piston assembly may include a housing and a piston movable relative to the housing into engagement with the outlet plate. The piston may be mounted in the housing for movement along a piston axis that is spaced apart from and parallel to the central axis.

In some embodiments, the wave rotor assembly may further include an outlet plate arranged adjacent to the aft end of the rotor drum. The outlet plate may be formed to include an outlet port aligned with at least some of the rotor passages at the aft end of the rotor drum. In some embodiments, the rotor drum may be mounted for rotation about the central axis relative to the outlet plate.

According to another aspect of the present disclosure, a method of operating a wave rotor assembly may include a number of steps. The method may include providing a rotor drum having a forward end and an aft end, an outlet plate offset from the aft end of the rotor drum by a clearance gap, and a piston assembly arranged to engage the outlet plate, introducing gasses into the rotor drum to cause a first force to be applied onto the outlet plate at the aft end of the rotor drum, and applying a pressure from the gasses in the rotor drum to the piston assembly to cause the piston assembly to apply a second force onto the outlet plate to counteract the first force. In some embodiments, the outlet plate may be formed to include a pressurizing passage arranged to allow the portion of the gasses to communicate with the piston assembly.

The wave rotor illustrated is an illustrative use of a wave rotor. In other embodiments, the disclosed features may be included in wave rotors used as pressure exchangers, flow dividers, flow combiners, etc.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
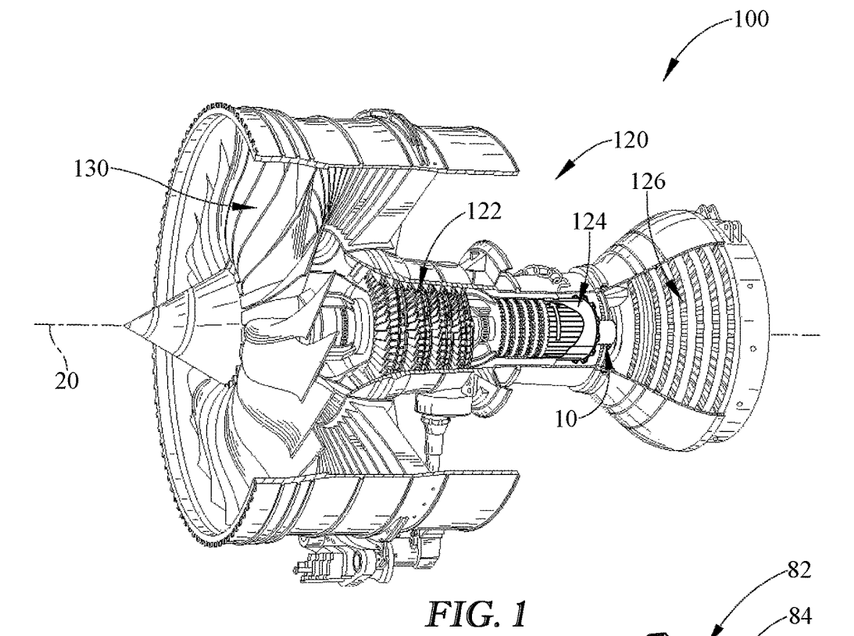
FIG. 1 is a cutaway view of a gas turbine engine including a wave rotor assembly arranged to continuously receive and ignite a mixture of fuel and air to produce hot high-pressure products that are directed into a turbine to drive the engine.

An illustrative aerospace gas turbine engine 100 includes a wave rotor assembly 124 as part of an engine core 120 that powers a fan assembly 130 as shown in FIG. 1. The wave rotor assembly 124 includes a wave rotor and a piston assembly 10 arranged to counteract pressure forces applied to the wave rotor assembly 124.

Illustratively, the wave rotor assembly 124 includes a wave rotor combustor 125 adapted to burn fueled air 354 as part of a combustion process 300 to power the engine 100 as shown in FIG. 1. A wave rotor combustor and piston assembly is an illustrative use of a wave rotor having the disclosed features. In other embodiments, the disclosed features may be included in wave rotors used as pressure exchangers, flow dividers, flow combiners, etc. Such other wave rotors may or may not include a combustion process.

Figure 2:
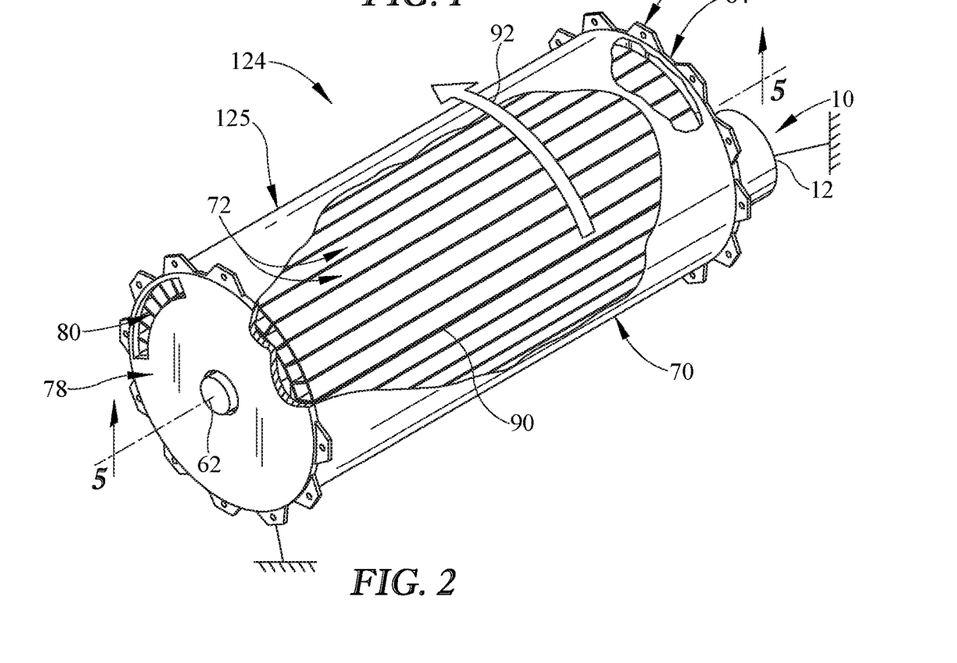
FIG. 2 is a cutaway view of the wave rotor assembly included in the gas turbine engine of FIG. 1 showing that the wave rotor assembly includes, from left to right, a wave rotor combustor formed to include a plurality of rotor passages that rotate about a central axis and a piston assembly arranged to engage an outlet plate of the wave rotor combustor to counteract pressure forces located within the rotor passages of the wave rotor combustor.

The wave rotor combustor 125 illustratively includes a rotor drum 70, an inlet plate 78, and an outlet plate 82 as shown in FIG. 2. The rotor drum 70 receives the flow of fuel and air 354 and ignites the fueled air 354 to power the engine core 120. The fuel and air enter the rotor drum 70 through an inlet port 80 formed in the inlet plate 78.

The outlet plate 82 is formed to include an outlet port 84 arranged to expel the corn busted gasses that result from the combustion process inside the rotor drum 70. The combustion process creates combusted gasses that apply pressure forces onto the inlet plate 78 and outlet plate 82.

Figure 5:
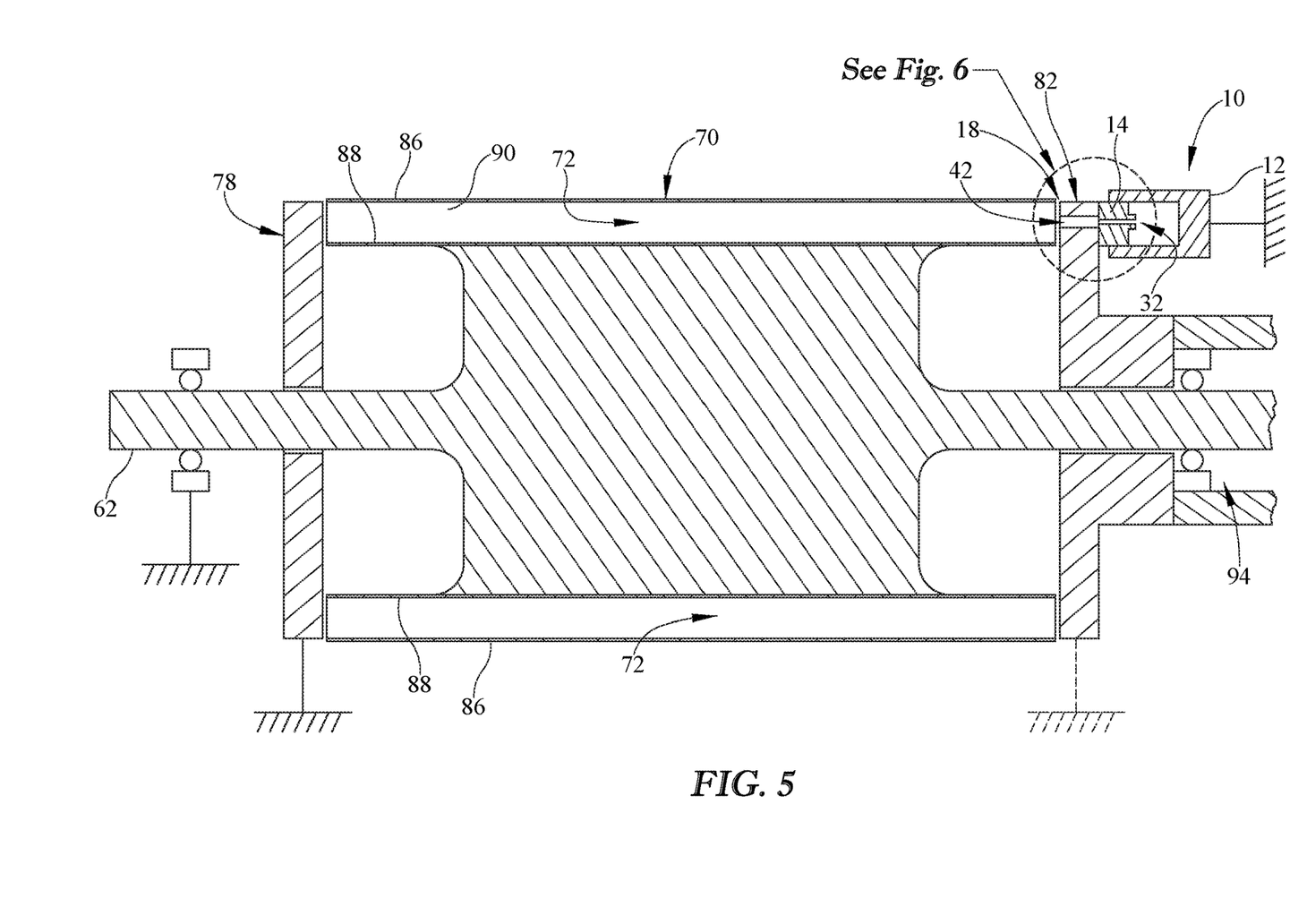
FIG. 5 is a sectional view of the wave rotor assembly of FIG. 2 taken at line 5-5 showing that, gasses in the rotor passages apply a force to the outlet plate and the gasses communicate through the piston into the housing to cause the piston to engage the outlet plate and counteract the pressure forces and reduce a net thrust load applied to the outlet plate.
Figure 5A:
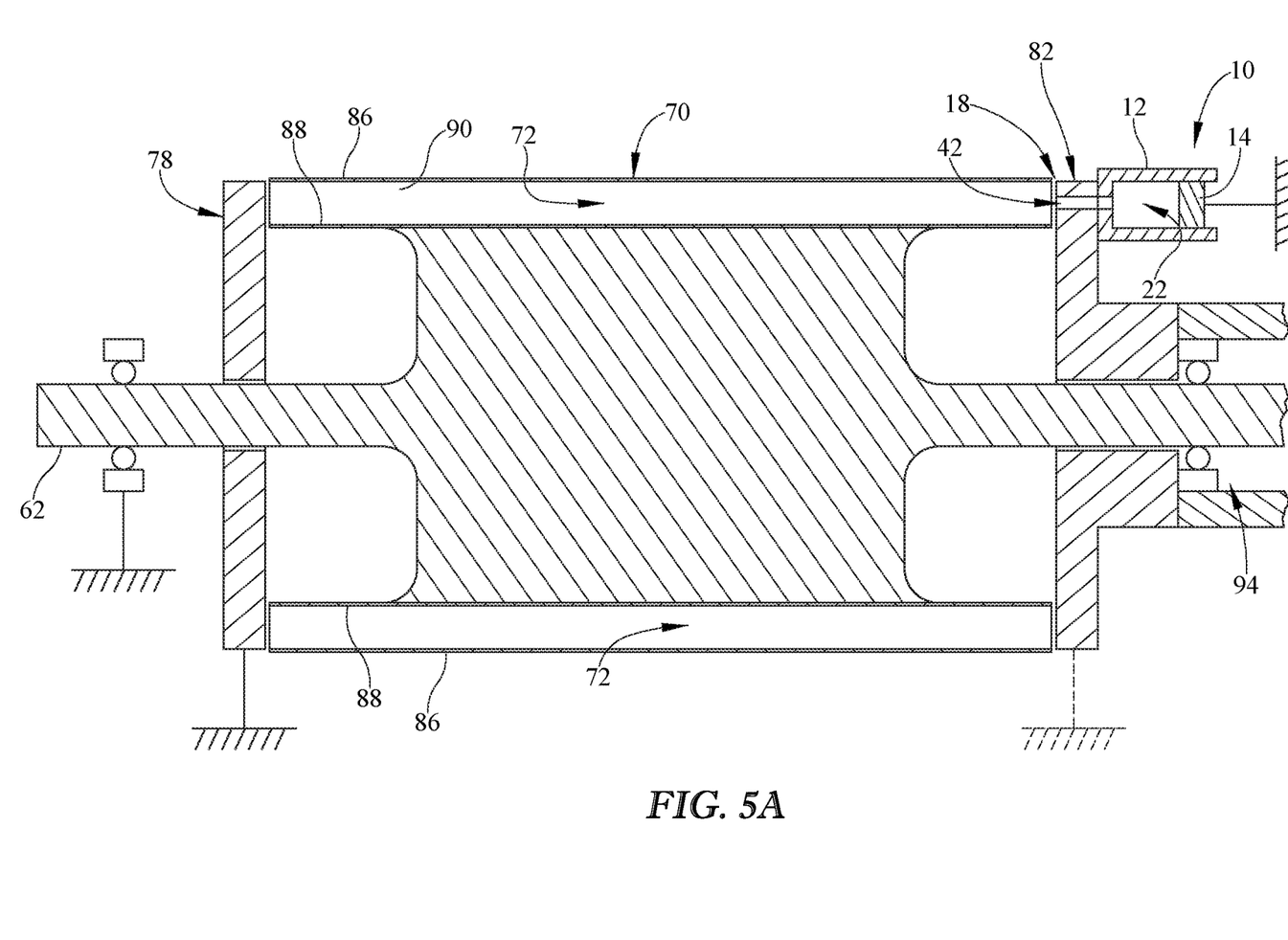
FIG. 5A is a sectional view of another embodiment of a piston assembly for use in a wave rotor assembly showing that the housing of the piston assembly engages the outlet plate and the piston is coupled to a fixed portion of the engine and further showing that gasses in the rotor passages apply a force to the outlet plate and the gasses communicate with the piston assembly to cause the piston assembly to counteract the force and reduce a net thrust load applied to the outlet plate.
Figure 6:
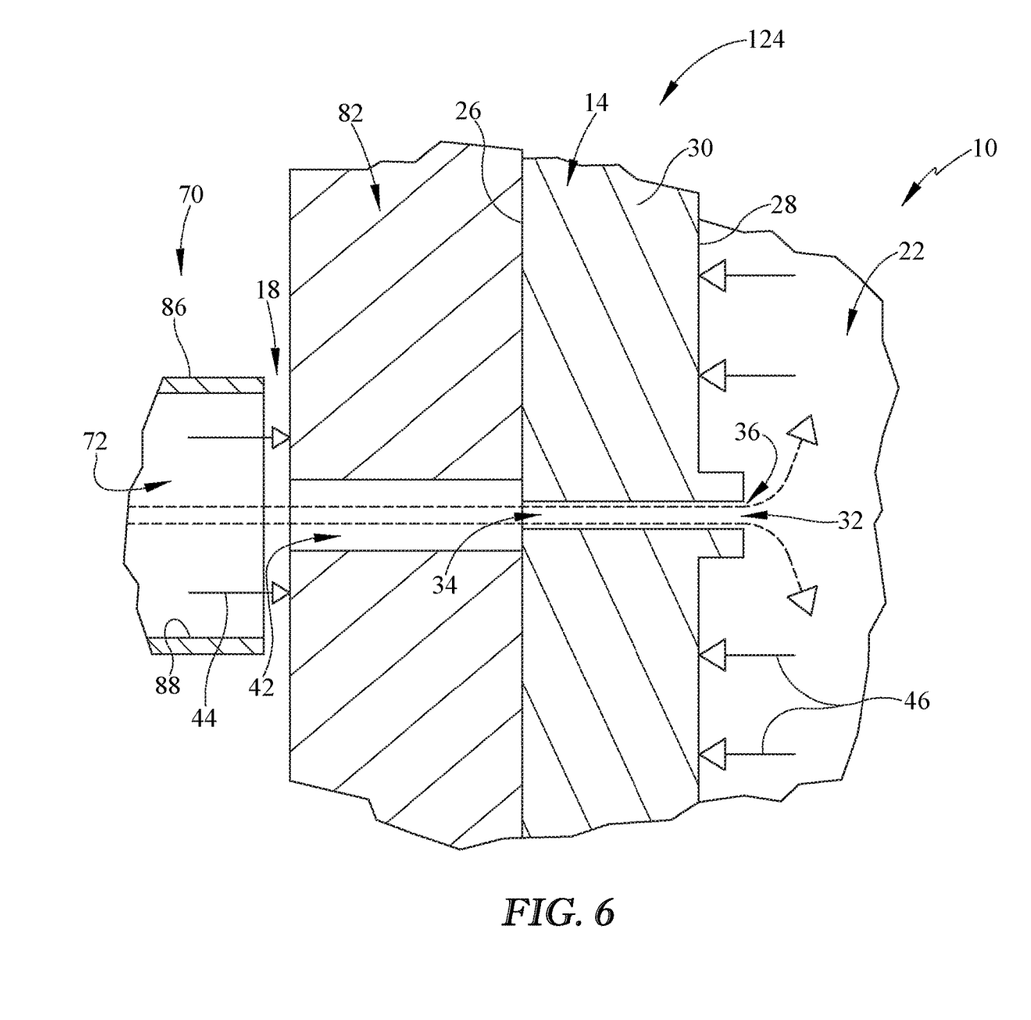
FIG. 6 is a sectional view similar to FIG. 5 showing that a clearance gap is formed between the rotor passages and the outlet plate and the piston engages the outlet plate to counteract net thrust loads applied to the outlet plate by gasses in the rotor passages.

As suggested in FIG. 6, the combusted gasses apply a first force 44 to the outlet plate 82 on the rotor side of the outlet plate 82. Illustratively, a relatively large portion of the pressure forces are applied in a predetermined region 40 as suggested in FIG. 4. In the illustrative embodiment, the predetermined region is a high-pressure combustion region. The first force 44 may be a net thrust load and may cause the outlet plate 82 to deform, move axially away from the rotor drum 70, or apply a net thrust load to a bearing system 94. As shown in FIGS. 5 and 5A, in some embodiments, the outlet plate 82 may be coupled to the bearing system 94. In other embodiments, the outlet plate 82 may be coupled to a fixed portion of the engine 100.

The description herein discusses the outlet plate 82 and the forces on the outlet plate 82. Nonetheless, similar forces may be applied to the inlet plate 78 and a piston assembly 10 may be used with the outlet plate 82 and/or the inlet plate 78. In the illustrative embodiment, combusted gasses apply forces onto the plates 78, 82. In other wave rotors, pressurized gasses or other pressure sources may apply a force onto the inlet plate 78 and/or outlet plate 82 without combustion.

The rotor drum 70 is mounted for rotation about a central axis 20 of the engine 100 as suggested in FIG. 2. The rotor drum 70 is formed to include a plurality of rotor passages 72 spaced apart from the central axis 20 that extend along the central axis 20. The rotor drum 70 includes a forward end 74 and an aft end 76 and the rotor passages extend between the forward and aft ends 74, 76. The fueled air 354 is received in the rotor passages 72 and combusted as the rotor passages 72 rotate about the central axis 20. The combusted gasses apply the pressure forces to the inlet plate 78 and the outlet plate 82 until the rotor passage 72 aligns with the outlet port 84 and the combusted gasses exit the rotor passages 72.

The combusted gasses are expelled from the rotor passages 72 through the outlet plate 82 into the turbine 126. The outlet plate 82 is offset from the aft end 76 of the rotor drum 70 by a clearance gap 18 as shown in FIGS. 5 and 6. The illustrative outlet plate 82 is mounted for translation along the central axis 20 relative to the rotor drum 70 to form the clearance gap 18. The clearance gap 18 allows the rotor drum 70 to rotate about the central axis 20 relative to the outlet plate 82 without engaging the outlet plate 82.

The first force 44 applied to the outlet plate 82 by the pressure forces creates a net thrust load on the outlet plate 82 and may cause the outlet plate 82 to deform, move relative to the rotor drum 70, or cause the outlet plate 82 to apply a net thrust load to the bearing system 94. A width of the clearance gap 18 may change if the outlet plate 82 deforms and/or moves. Changes in the width of the clearance gap 18 may cause damage and wear to the components and/or reduce the efficiency of the wave rotor combustor 125. A net thrust load applied to the bearing system 94 may damage the bearing system 94 over time.

In the illustrative embodiment, the piston assembly 10 engages the outlet plate 82 to counteract the pressure forces applied to the outlet plate 82 by the gasses as shown in FIGS. 5 and 6. The piston assembly 10 controls the net thrust load applied to the outlet plate 82. As a result, the width of the clearance gap 18 may be controlled and/or the net thrust load applied to the bearing system 94 may be reduced or eliminated. In other embodiments, a piston assembly 10 may engage the inlet plate 78 and/or outlet plate 82 to counteract the pressure forces applied to the inlet plate 78 and outlet plate 82 respectively. In other wave rotors, a piston assembly may be used to counteract pressure forces from sources other than combusted gasses such as, for example, pressurized gasses.

The piston assembly 10 includes a housing 12 and a piston 14 that is movable relative to the housing 12 as shown in FIGS. 3-6. Illustratively, the housing 12 forms a chamber 22 that receives the piston 14. During operation of the wave rotor assembly 124, combusted gasses from the rotor passages 72 communicate with the chamber 22 through a pressurizing passage 42 formed in the outlet plate 82. The gasses in the chamber 22 act on the piston 14 to cause the piston 14 to apply a second force 46 to the outlet plate 82 to counteract the first force 44 applied to the outlet plate 82.

The piston assembly 10 is configured to allow the components of the wave rotor combustor 125 to change dimensions without changing the width of clearance gap 18. For example, the wave rotor combustor 125 may change dimensions due to thermal growth or stress levels, such as, for example, those brought about from thrust loads. As the wave rotor combustor 125 grows, the piston assembly 10 controls the width of the clearance gap 18. The piston assembly 10 reduces the non-uniformity of loading on the outlet plate 82. The piston assembly 10 counteracts pressure forces on the outlet plate 82 at the predetermined region 40. As such, high bending moments through the wave rotor combustor 125 are reduced.

Figure 3:
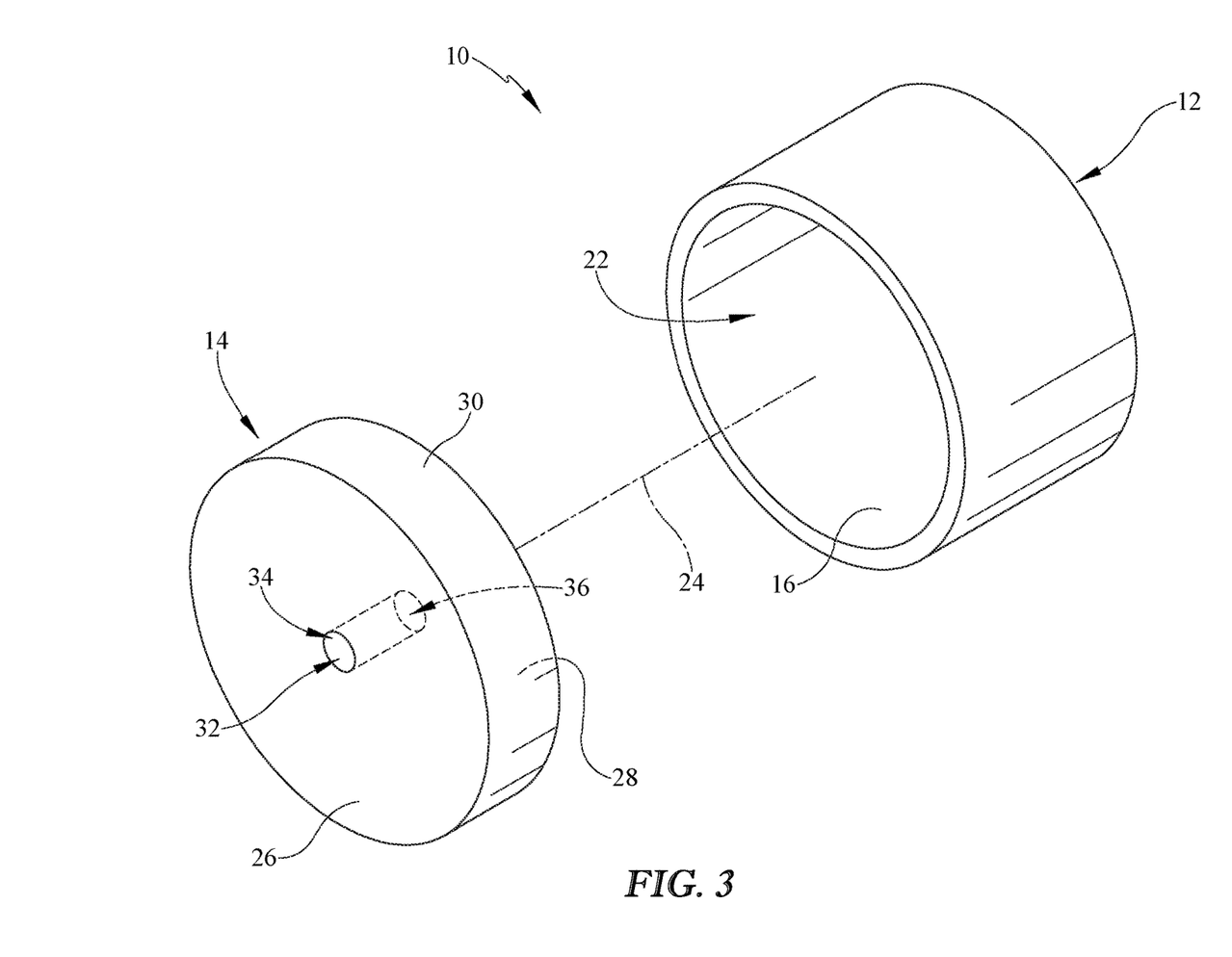
FIG. 3 is an exploded view of the piston assembly showing that the piston assembly includes a piston and a housing arranged to receive the piston and the piston is formed to include a piston passage to allow gasses to communicate between the rotor passages and the piston assembly.
Figure 4:
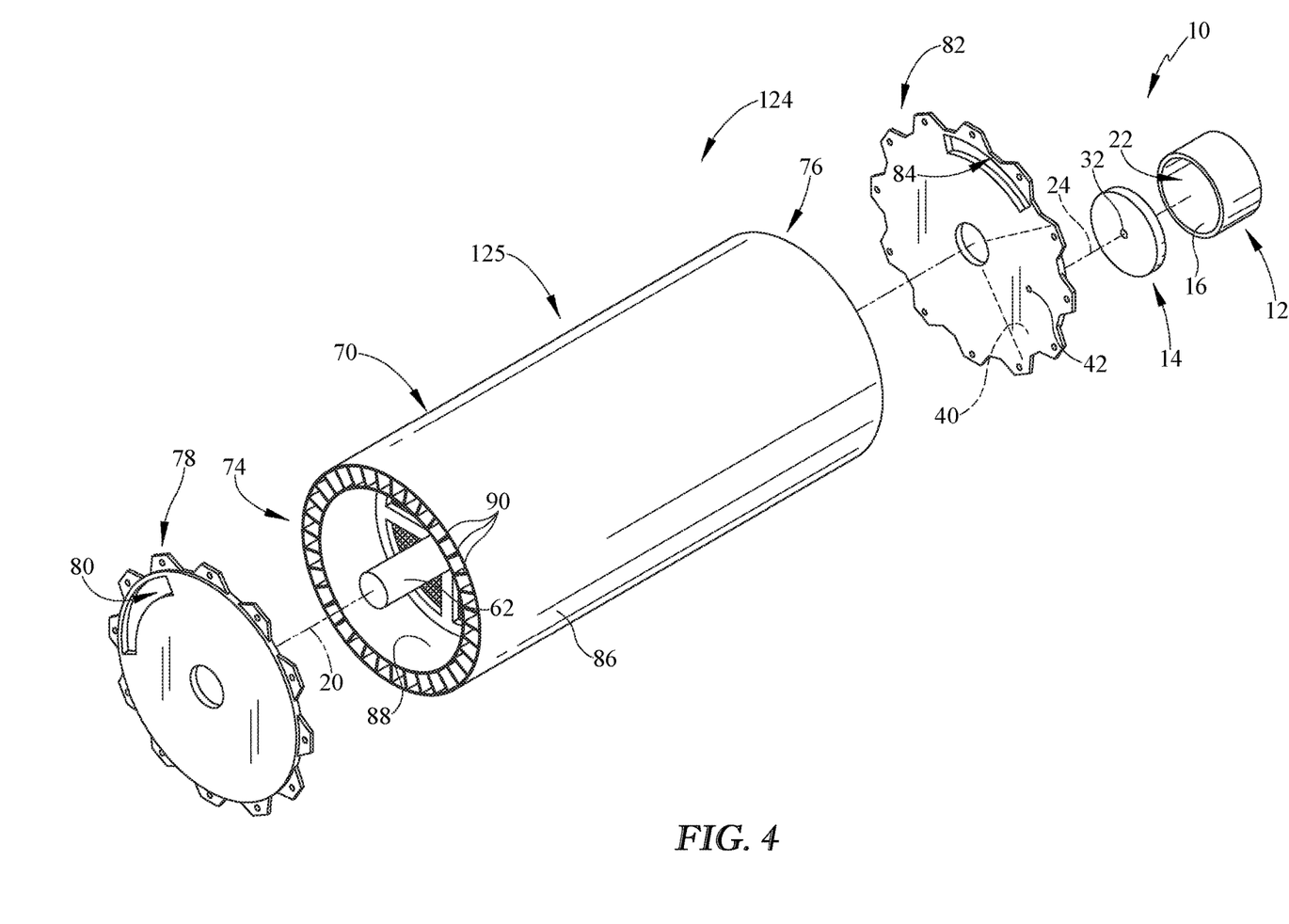
FIG. 4 is an exploded view of the wave rotor assembly showing that the wave rotor assembly includes the wave rotor combustor and the piston assembly arranged to counteract forces applied onto the outlet plate included in the wave rotor combustor.

In the illustrative embodiment, the piston assembly 10 extends along a piston axis 24 as shown in FIGS. 3 and 4. In the illustrative embodiment, the piston axis 24 is spaced apart from and parallel to the central axis 20. Illustratively, the housing 12 is coupled to the engine core 120 and the piston 14 engages the outlet plate 82. In other embodiments, the piston 14 is coupled with the outlet plate 82 via a connecting rod and the housing 12 engages the outlet plate 82 as shown in FIG. 5A.

The housing 12 includes an inner wall 16 that defines the chamber 22 as shown in FIG. 3. The chamber 22 is sized to receive the piston 14. The combusted gasses apply a force to the housing 12 and the piston 14 to cause the piston 14 to apply a counteracting force to the outlet plate 82. In the illustrative embodiment, the housing 12 forms a cylinder 12 as shown in FIG. 3.

The piston 14 is located within the chamber 22 formed in the housing 12 as suggested in FIGS. 3-6. The piston 14 includes a front face 26, a back face 28, a sidewall 30 extending between and interconnecting the front and back faces 26, 28, and the piston passage 32. The front face 26 engages the outlet plate 82 and applies the second force 46 to the outlet plate 82. The back face 28 is acted on by the gasses in the chamber 22 as shown in FIG. 6. The sidewall 30 engages the inner wall 16 of the housing 12 to form a seal that blocks the gasses from escaping the chamber 22 between the piston 14 and the housing 12. Illustratively, the piston passage 32 is aligned with the pressurizing passage 42 to allow communication of the gasses in the rotor passages 72 with gasses in the chamber 22. Communication may be, for example, communicating a pressure. In embodiments where the housing 12 engages the outlet plate 82, the housing 12 is formed to include a passage to allow gasses to communicate through the housing 12 and the piston passage 32 in the piston 14 is eliminated as shown in FIG. 5A.

The front face 26 faces the outlet plate 82 as shown in FIGS. 4-6. The front face 26 engages the outlet plate 82. The gasses in the rotor passage 72 apply the first force 44 to the outer plate 82. As the gasses in the chamber 22 apply a force to the piston 14, the front face 26 applies the second force 46 to the outlet plate 82 to counteract the first force 44.

Illustratively, the front face 26 is generally flat. The front face 26 includes an inlet aperture 34 as shown in FIG. 3. The inlet aperture 34 opens into the piston passage 32 to allow gasses to communicate from the pressurizing passage 42 through the piston passage 32 into the chamber 22.

The back face 28 faces away from the outlet plate 82 as shown in FIGS. 4-6. The back face 28 locates the gasses between the back face 28 and the inner wall 16 of the cylinder. The gasses apply an outward force in all directions. The outward force applied to the back face 28 overcomes the first force 44 applied to the piston 14 by the outlet plate 82 and causes the piston 14 to apply the counteracting force to the outlet plate 82.

The back face 28 includes an outlet aperture 36 as shown in FIG. 3. The outlet aperture 36 opens into the piston passage 32 to allow gasses to communicate from the pressurizing passage 42 through the piston passage 32 into the chamber 22.

The sidewall 30 extends around the piston 14 circumferentially as shown in FIG. 3. The sidewall 30 engages the inner wall 16 of the housing 12 to seal the pressurized fluids in the chamber 22. In some embodiments, the sidewall 30 includes a number of seals. In some embodiments, the sidewall 30 is lubricated.

The piston passage 32 extends through the piston 14 between the front face 26 and the back face 28. The piston passage 32 opens into the pressurizing passage 42 formed in the outlet plate 82 to allow gasses to communicate from the rotor passages 72 through the piston 14 and with the chamber 22. The gasses cause the piston 14 to apply a force to the outlet plate 82. As such, the pressure within the chamber 22 changes with the pressure within the rotor passages 72. Thus, the second force 46 applied to the outlet plate 82 by the piston 14 changes with the pressure within the rotor passages 72.

In operation, the gasses in the rotor passages 72 apply the first force 44 to the outlet plate 82 and exert a net thrust load on a rotor side of the outlet plate 82. The net thrust load may cause a portion of the outlet plate 82 to deform, and/or move away from the rotor drum 70, and/or transmit a thrust load to the bearing system 94. The gasses in the rotor passage 72 communicate through the piston 14 and with the chamber 22. As such, the pressure on the rotor side and the pressure in the chamber 22 are in equilibrium. The gasses apply a force to the back face 28 to cause the piston 14 to apply the second force 46 to the outlet plate 82 to counteract the first force 44. As such, the clearance gap 18 formed between the rotor drum 70 and the outlet plate 82 and/or the net thrust load applied to the bearing system are controlled.

In some embodiments, the wave rotor assembly 124 includes a plurality of piston assemblies 10. The piston assemblies 10 may be arranged circumferentially about the inlet plate 78 and/or the outlet plate 82. The piston assemblies 10 may be located in a number of different locations radially relative to one another. In some embodiments, the piston assemblies 10 may be of varying sizes relative to one another. Each piston assembly 10 may be in communication with a local rotor passage 72.

In other embodiments, the piston assembly 10 may be powered by a source other than the gasses from the rotor passages 72. In some embodiments, the housing 12 may receive one or more of a plurality of pressurized fluids in the chamber 22 to apply a force to the piston 14. In other embodiments, the pressurized fluid is pressurized hydraulic fluid received from a hydraulic fluid source. In other embodiments, the pressurized fluid is pressurized pneumatic fluid received from a pneumatic fluid source. In embodiments where the pressurized fluid is not received from the rotor passages 72, the pressurizing passage 42 and the piston passage 32 may be omitted to block the pressurized fluid from entering the rotor passages 72.

Figure 7:
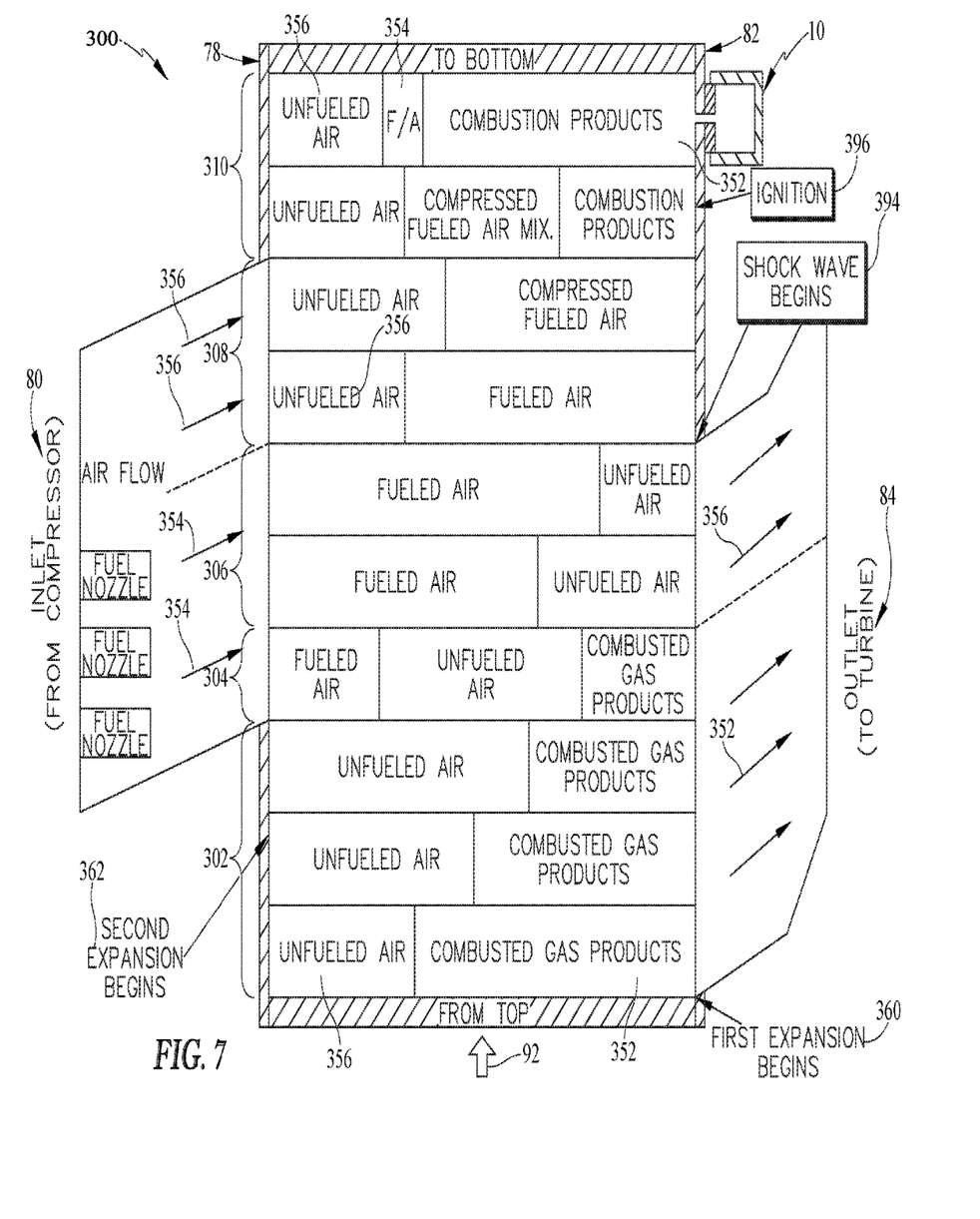
FIG. 7 is a diagrammatic view of a cycle of the combustion process that occurs within each rotor passage of the wave rotor combustor and depicts the cycle of a single rotor passage at discrete circumferential positions as it completes a revolution about the central axis.
Figure 8:
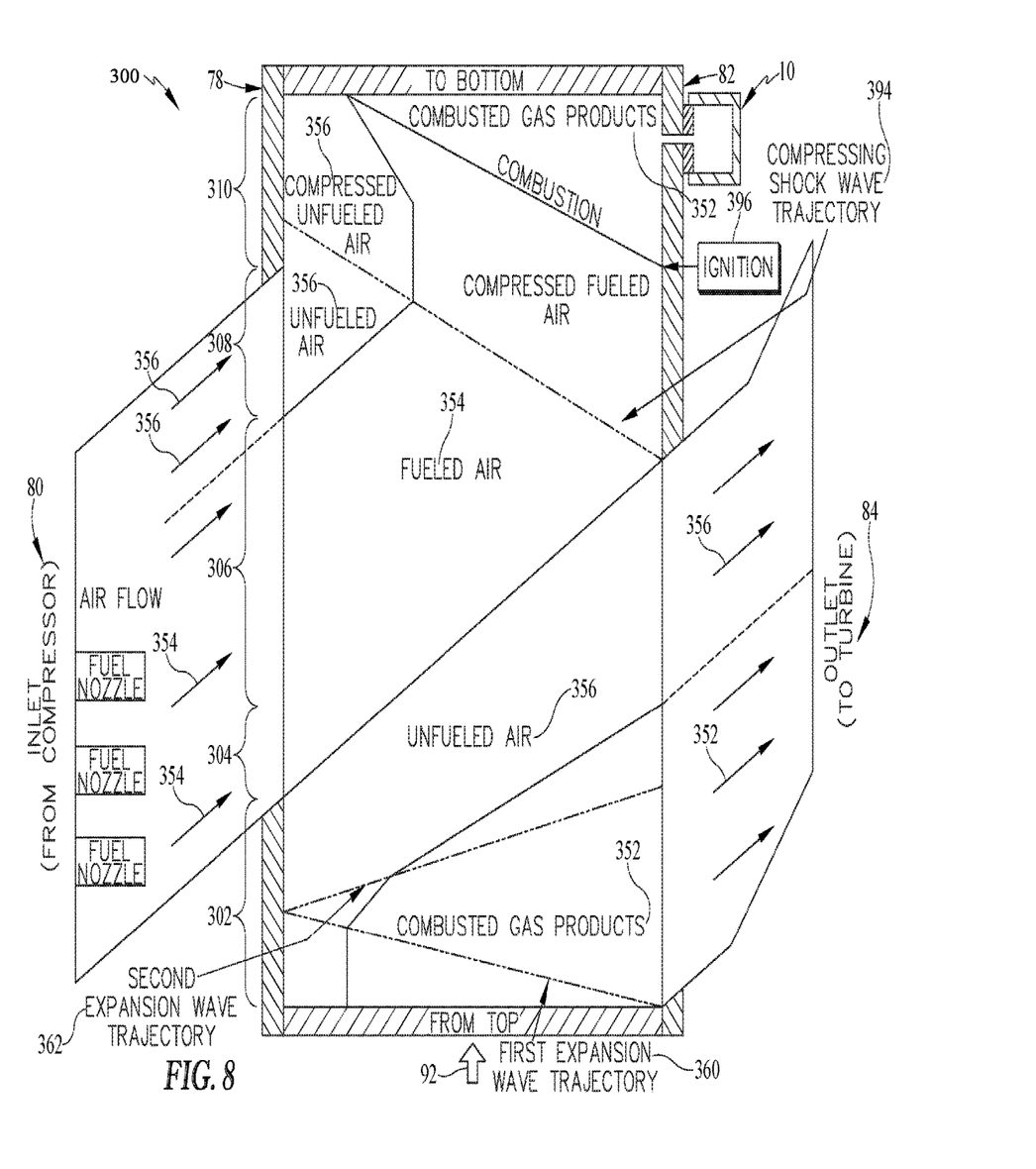
FIG. 8 is another diagrammatic view of a cycle of the combustion process that occurs within each rotor passage of the wave rotor combustor and depicts the cycle of a single rotor passage at continuous circumferential positions as it completes a revolution about the central axis.

The wave rotor combustor 125 receives and combusts the fueled air 354 in the combustion process 300 as shown in FIGS. 7 and 8. The wave rotor combustor 125 is configured to use transient internal fluid flow to compress fuel and air prior to combustion to improve the efficiency of combustion within the wave rotor combustor 125. The wave rotor combustor 125 is arranged to receive and combust the fueled air 354, which produces the combusted gasses, as part of the combustion process 300.

In the illustrative embodiment, the inlet plate 78 includes a single inlet port 80 and the outlet plate 82 includes a single outlet port 84. In other embodiments, the inlet plate 78 is formed to include a plurality of inlet ports 80 and the outlet plate 82 is formed to include a plurality of outlet ports 84. In some embodiments, the plates 78, 82 are arranged to seal the rotor drum 70 to minimize leakage of flow out of the rotor passage 72.

The rotor drum 70 is formed to include the plurality of rotor passages 72 that extend along the central axis 20 as shown in FIG. 2. In the illustrative embodiment, the rotor passages 72 rotate about the central axis 20 in a counter-clockwise direction as indicated by arrow 92. The rotor passages 72 are arranged so that the rotor passages 72 align with the inlet port 80 at predetermined intervals when the rotor drum 70 rotates about the central axis 20 to allow the fueled air 354 to flow through the inlet port 80 into the rotor passages 72.

As the rotor passages 72 rotate about the central axis 20, the fueled air 354 is combusted to form high-pressure combusted gasses. The high-pressure combusted gasses apply the pressure forces to the outlet plate 82. The rotor passages 72 align with the outlet port 84 at predetermined intervals when the rotor drum 70 rotates about the central axis 20 to allow the combusted gasses in the rotor passages 72 to flow through the outlet port 84 into the turbine 126.

The rotor drum 70 is mounted for rotation about the central axis 20 relative to the inlet plate 78 and outlet plate 82 as suggested by arrow 92 in FIG. 2. In other embodiments, the rotor drum 70 rotates in an opposite direction.

The rotor drum 70 includes an outer tube 86, an inner tube 88, and a plurality of webs 90 as shown in FIG. 2. The outer tube 86, the inner tube 88, and the plurality of webs 90 cooperate to form the plurality of axially extending rotor passages 72. In the illustrative embodiment, the rotor passages 72 extend axially and generally parallel with the central axis 20. In other embodiments, the rotor passages 72 extend axially along and circumferentially about the central axis 20.

The outer tube 86 extends around the central axis 20 to form a radially outer portion of the rotor passages 72. The inner tube 88 extends around the central axis 20 and is positioned radially between the central axis 20 and the outer tube 86 to form a radially inner portion of the rotor passages 72. The plurality of webs 90 are spaced apart circumferentially and extend between and interconnect the outer tube 86 and the inner tube 88 to separate the plurality of rotor passages 72.

In the illustrative embodiment, the rotor passages 72 are generally parallel with the central axis 20 and the rotor drum 70 is rotated by a drive shaft 62. In other embodiments, the rotor passages 72 extend axially along and circumferentially around the central axis 20. In some embodiments, the rotor passages 72 are arranged to cause the rotor drum 70 to rotate as a result of the shape of the rotor passages 72 and the combustion process that occurs within the rotor passages 72.

An illustrative combustion process 300 occurs within the rotor passages 72 as the rotor passages 72 rotate about the central axis 20 as suggested in FIGS. 7 and 8. The combustion process 300 is substantially a constant volume combustion process.

The combustion process 300 occurs in each rotor passage 72 of the wave rotor combustor 125 as depicted in a space-time wave diagram shown in FIGS. 7 and 8. The wave diagram shown in FIG. 7 depicts the sequence of events occurring during one cycle within a rotor passage 72 at discrete circumferential positions. The arrow 92 indicates the direction of rotation of the rotor passage 72. Upon the rotation of the rotor drum 70, each of the rotor passages 72 are sequentially brought into alignment with the inlet port 80 and the outlet port 84.

The combustion process 300 is depicted in another space-time wave diagram shown in FIG. 8. The wave diagram shown in FIG. 8 depicts the sequence of events occurring during one cycle within a rotor passage 72 in continuous circumferential positions. The arrow 92 indicates the direction of rotation of the rotor passage 72.

The combustion process 300 is periodic such that the top of each wave diagram loops around and join with itself at the bottom of the diagram. The wave diagrams, for the purpose of description, may be started at any point. However, for convenience, the description is started at step 302 corresponding to the bottom of the wave diagrams shown in FIGS. 7 and 8.

In step 302, the forward end 74 of the rotor passage 72 is blocked by the inlet plate 78. The aft end 76 of the rotor passage 72 is aligned with and opens into the outlet port 84 formed in the outlet plate 82. The rotor passage 72 contains unfueled air 356 and combusted gas products 352. The combusted gas products 352 are hot high-pressure products resulting from the combustion of the fueled air 354. The pressure of the combusted gas products 352 applies the first force onto the inlet plate 78 and the outlet plate 82 in the predetermined region 40.

As the rotor passage 72 opens into the outlet port 84, the combusted gas products 352 expand and exit the rotor passage 72 through the relatively low-pressure outlet port 84. A first expansion wave 360 originates from the aft end 76 of the rotor passage 72 and propagates toward the forward end 74 expelling the combusted gas products 352 through the outlet port 84. The combusted gas products 352 exiting the outlet port 84 are relatively hot and relatively-high velocity combusted gasses.

As the rotor passage 72 continues to rotate, the first expansion wave 360 reaches the forward end 74 and forms a second expansion wave 362. The second expansion wave 362 propagates toward the aft end 76 expelling the combusted gas products 352 through the outlet port 84. As such, the combusted gas products 352 continue to expand and exit through the outlet port 84 and the unfueled air 356 expands toward the outlet port 84. The combusted gas products 352 exiting through the outlet port 84 after the second expansion wave 362 are relatively cooler and relatively-low velocity combusted gasses due to the expansion of the combusted gas products 352.

In a step 304, the rotor passage 72 aligns with and opens into the inlet port 80. The fueled air 354 is directed through the inlet port 80 into the rotor passage 72. The fueled air 354 has relatively greater pressure than the remaining unfueled air 356 and combusted gas products 352. As such, the fueled air 354 is drawn into the rotor passage 72 and the unfueled air 356 and the combusted gas products 352 flow axially through the outlet port 84.

In the illustrative embodiment, the compressor 122 provides a flow of unfueled air 356 upstream of the inlet port 80. Illustratively, fuel nozzles continuously spray fuel into a portion of the flow of unfueled air 356 upstream of the inlet port 80. The fuel and air mix before entering the rotor passage 72 to form the fueled air 354. The fueled air 354 is separated from the combusted gas products 352 in the rotor passage 72 by the unfueled air 356. As such, the fueled air 354 is blocked from unintentional ignition. In the illustrative embodiment, air is used in the fueled air 354 and the unfueled air 356. In other embodiments, air may be omitted and replaced with a fueled oxidant and an unfueled oxidant 356 respectively.

In a step 306, the fueled air 354 continues to be directed into the rotor passage 72 until the unfueled air 356 has been significantly expelled out of the rotor passage 72. The unfueled air 356 is relatively cooler than the combusted gas products 352.

The wave rotor combustor 125 is arranged such that, as the unfueled air 356 is significantly expelled out of the rotor passage 72, the rotor passage 72 rotates beyond the outlet port 84. As a result, the outlet plate 82 blocks the fueled air 354 from escaping through the aft end 76 of the rotor passage 72. When the aft end 76 of the rotor passage 72 is closed by the outlet plate 82, a shock wave 394 begins at the aft end 76 of the rotor passage 72 and propagates toward the forward end 74. The shock wave 394 causes the fueled air 354 to compress.

In a step 308, the flow of fueled air 354 ends and the flow of unfueled air 356 continues to enter the rotor passage 72 due to the pressure in rotor passage 72 being lower than the pressure at the inlet 80. The compressing shock 394 compresses the fueled air 354 and the unfueled air 356.

In a step 310, the rotor passage 72 rotates beyond the inlet port 80 to block the flow of unfueled air 356 from entering the rotor passage 72. The fluid within the rotor passage 72 is blocked from escaping the rotor passage 72 by the inlet plate 78 at the forward end 74 and by the outlet plate 82 at the aft end 76. An ignition source 396 ignites the compressed fueled air 354 at the aft end 76 of the rotor passage 72. In other embodiments, the compressed fueled air 354 ignites as a result of auto-ignition.

As the fueled air 354 combusts, the fueled air 354 expands to form the combusted gas products 352. The portion of the unfueled air 356 that did not receive fuel added by the fuel nozzle, having entered during step 308, experiences no combustion and is compressed by shock wave 394. The combusted gas products 352 expand and further compress the unfueled air 356. The combusted gas products 352 communicate with the chamber 22 through the pressurizing passage 42 and the piston passage 32. The piston 14 applies the second force 46 to the outlet plate 82 to counteract the first force 44. The rotor passage 72 continues to rotate about the central axis 20 and returns to step 302 at the bottom of the wave diagram shown in FIGS. 7 and 8.

According to an aspect of the present disclosure, a wave rotor includes a non-rotating movable end wall (sometimes called an endplate) to control rotor clearances between the end wall and the rotor drum. A piston and cylinder are placed between the movable end wall of the wave rotor and a structural member fixed to the wave rotor housing and bearing support system. A volume of the cylinder between the head end of the cylinder and the piston is in communication with the pressurized region within the rotor passages. In some embodiments, the piston is connected to the end plate via a connecting rod. In some embodiments, the cylinder is connected to the end plate.

The pressure within the rotor passages exerts a net thrust load onto the end wall on the rotor side. In some embodiments, the net thrust load is carried through a bearing system which connects the movable end wall and the rotor drum. The pressure on the rotor side is communicated to the volume within the piston cylinder to equilibrate with it and the piston-cylinder combination acts to exert a counter balancing thrust load that is proportional to the pressure, thus, controlling the net thrust load carried through the bearing system that is connecting the movable end wall to the rotor as well as to the remainder of the bearing system of the rotor by way of the wave rotor housing.

These features may be applied to many wave rotor applications such as, for example, pressure exchangers, divider cycles, or combustion wave rotors. They may be applied to wave rotors of the axial, radial, or mixed flow type. Multiple piston cylinder units may be placed around the rotor at select positions on the movable endplate to balance the various pressure loads exerted on it by the rotor passage pressures in that these pressures vary.

The features disclosed may reduce the absolute value of the load on the bearing system of the wave rotor. Thrust loads on the bearing system may be about 4,700 pounds force for a rotor with a diameter of about 8 inches, for example. The features disclosed may balance all or part of the load. The reduction of the load on the bearings allows the size of the bearings to be smaller providing greater compactness of the wave rotor. The close coupled balancing of thrusts across the end plate reduces the forces carried by both the end plate and the structure between the end plate and the bearings, thus, allowing lighter more compact wave rotors.

Reduction of the forces carried by the endplate reduces the magnitude of deflections within the endplate. Large deflections would either enlarge the clearance between the rotor and the plate causing additional leakage or to close the clearance resulting in possible contact between the rotor and the endplate causing damage to the rotor and/or the endplate. The features described allow the fixed wave rotor housing to carry the net blow-off load of the wave rotor. The features allow the wave rotor housing to change dimension due to either thermal growth or stress levels brought about from thrust loads without changing the running clearance at the faces of the wave rotor. This is accomplished by relative motion between the piston and the cylinder canceling the effect of these dimensional changes.

The piston assembly may reduce the degree of non-uniformity of the loading on the end plate and bearing system since the piston assembly may allow pressure forces in the azimuthal direction around the wave rotor to be counter balanced at or near the particular azimuthal position which they occur. This may avoid high bending moments to be carried through the wave rotor structure and, thus, may avoid the related deflections in the end plate and rotor shafting that can adversely affect clearances and generate cycle fatigue within the members.

The piston assembly may reduce the magnitude of the change in the bearing loads that the wave rotor experiences as the operating conditions change. The pressure in the piston assembly may be related continuously and directly by way of communication of the pressure causing the end plate thrust loading, a balance is maintained despite a changing of the pattern of the azimuthal pressures in the rotor passages resulting from a change to the operating conditions of the wave rotor. As an example, the combusting to non-combusting transition in the rotor passages of a wave rotor combustor may create significant shifts in the rotor passage pressures. The self-balancing feature of the piston assembly may control the amount of change to the bearing loads and structural deflections. This feature is helpful regarding multiple cycles per revolution designs where combustion in one quadrant of the wave rotor cycle may not be matched in all events by a symmetrical combustion in another quadrant of the wave rotor cycle.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A wave rotor assembly comprising
a rotor drum having a forward end and an aft end, the rotor drum mounted for rotation about a central axis and including a plurality of rotor passages spaced apart from the central axis that extend along the central axis,
an outlet plate offset from the aft end of the rotor drum by a clearance gap arranged to interact with gasses exiting the rotor passages at the aft end of the rotor drum, the outlet plate mounted for translation along the central axis relative to the rotor drum, and
a piston assembly including a housing and a piston movable relative to the housing into engagement with the outlet plate to counteract pressure forces applied onto the outlet plate by gasses within the rotor passages at the aft end of the rotor drum to control translation of the outlet plate along the central axis,
wherein the outlet plate is formed to include an outlet port spaced circumferentially apart from the piston assembly and a pressurizing passage aligned circumferentially with the piston assembly to allow gasses in the rotor passages to communicate with the piston assembly and wherein the piston is formed to include a piston passage aligned with the pressurizing passage formed in the outlet plate.

2. The wave rotor assembly of claim 1, wherein the piston includes a front face that faces the outlet plate and a back face spaced apart from and opposite the front face and the piston passage extends through the piston between the front face and the back face.

3. The wave rotor assembly of claim 1, wherein the outlet port extends circumferentially around a portion of the outlet plate to conduct gasses exiting out of the rotor passages at the aft end of the rotor drum.

4. The wave rotor assembly of claim 1, wherein the pressure forces of the gasses within the rotor passages are applied onto the outlet plate in a predetermined region and the piston is aligned with the predetermined region.

5. The wave rotor assembly of claim 1, wherein the piston is mounted in the housing for movement along a piston axis that is spaced apart from and parallel to the central axis.

6. The wave rotor assembly of claim 1, further comprising an inlet plate arranged adjacent to the forward end of the rotor drum wherein the inlet plate is formed to include an inlet port aligned with at least some of the rotor passages at the forward end of the rotor drum.

7. The wave rotor assembly of claim 6, wherein the rotor drum is mounted for rotation about the central axis relative to the inlet plate.

8. The wave rotor assembly of claim 1, wherein the rotor drum includes an inner tube, an outer tube, and a plurality of webs extending radially between the inner tube and the outer tube to define the rotor passages.

9. A wave rotor assembly comprising
a rotor drum having a forward end and an aft end, the rotor drum mounted for rotation about a central axis and including a plurality of rotor passages spaced apart from the central axis that extend along the central axis,
an inlet plate arranged to block gasses from exiting the rotor passages at the forward end of the rotor drum, and a piston assembly arranged to engage with the inlet plate to counteract pressure forces applied onto the inlet plate by gasses within the rotor passages at the forward end of the rotor drum, wherein the inlet plate is formed to include an inlet port spaced circumferentially apart from the piston assembly and a pressurizing passage aligned circumferentially with the piston assembly to allow gasses in the rotor passages to communicate with the piston assembly and wherein the piston assembly includes a housing engaged with the inlet plate and a piston that is formed to include a piston passage aligned with the pressurizing passage formed in the inlet plate.

10. The wave rotor assembly of claim 9, wherein the pressure forces of the gasses within the rotor passages are applied onto the inlet plate in a predetermined region, and the housing is aligned with the predetermined region.

11. The wave rotor assembly of claim 9, further comprising an outlet plate arranged adjacent to the aft end of the rotor drum wherein the outlet plate is formed to include an outlet port aligned with at least some of the rotor passages at the aft end of the rotor drum.

12. The wave rotor assembly of claim 11, wherein the rotor drum is mounted for rotation about the central axis relative to the outlet plate.

13. A method of operating a wave rotor assembly, the method comprising providing a rotor drum having a forward end and an aft end, an outlet plate offset from the aft end of the rotor drum by a clearance gap, and a piston assembly arranged to engage the outlet plate, introducing gasses into the rotor drum to cause a first force to be applied onto the outlet plate at the aft end of the rotor drum, and applying a pressure from the gasses in the rotor drum to the piston assembly to cause the piston assembly to apply a second force onto the outlet plate to counteract the first force, wherein the outlet plate is formed to include an outlet port spaced apart circumferentially from the piston assembly and a pressurizing passage aligned circumferentially with the piston assembly to allow a portion of the gasses to communicate with the piston assembly and wherein a piston included in the piston assembly is formed to include a piston passage that is aligned with the pressurizing passage formed in the outlet plate.

\* \* \* \* \*